Patented July 23, 1940

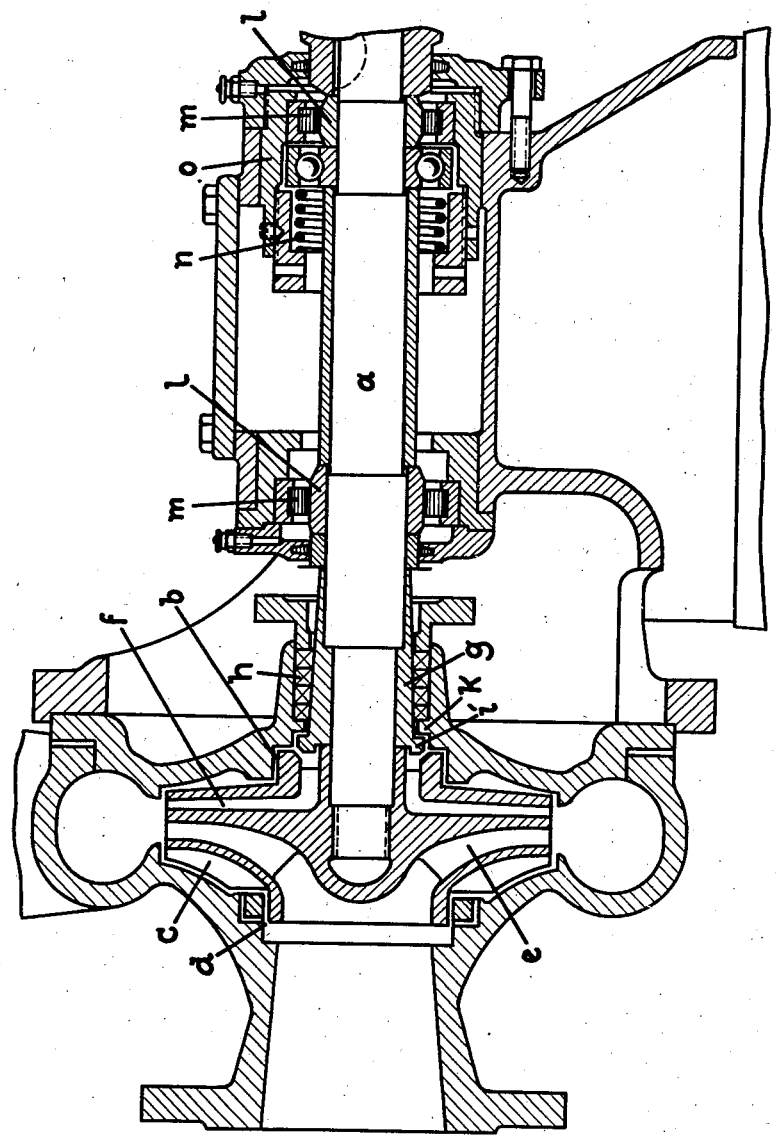

2,209,109

UNITED STATES PATENT OFFICE 2,209,109

CENTRIFUGAL PUMP WITH AXIAL MOVEMENT OF THE SHAFT

Paul Bungartz, Magdeburg, Germany, assignor to the firm A. W. Mackensen, Magdeburg, Germany, and himself Application May 22, 1937, Serial No. 144,286
In Germany November 30, 1935

2 Claims. (Cl. 103—111)

My invention relates to centrifugal pumps and more particularly to such pumps, in which the shaft can be axially displaced.

In pumps of this type, the packing is usually effected by valve surfaces, which, when the pump is at rest, are in contact with each other, but which, when the pump is in operation, become separated to prevent them from wear. To permit the valves to be renewed, however, or to be reground, the pump must be dismantled.

One special object of the present invention is to provide, in a pump of the axially displaceable shaft type, shaft packing means in the form of rings having the advantage of longevity as compared with shaft packing means in the form of valve surfaces; to provide means whereby said packing rings, when worn, may readily be replaced without dismantling the pump; to provide means whereby said packing rings effectively seal the pump shaft when the pump is idle, and to provide means whereby said packing rings are relieved of wear during wet operation of the pump.

Another special object of the invention is to provide an auxiliary shaft sealing means which remains inoperative as long as the packing rings are not badly worn, but which comes into operation to seal the shaft when the packing rings become badly worn.

For a fuller understanding of my invention, I refer to the embodiment shown by way of illustration in the annexed drawing, the single figure being a sectional view of the new pump.

At $a$ is shown the impeller shaft rotatably mounted in the pump casing and to the forward end of which is fixed the main rotor shown at $e$. At $c$ are shown relief blades provided on the forward, or front, end of the rotor $e$. At $f$ is shown the auxiliary rotor which, for reasons of convenience, is made as a single unit with the main rotor $e$, but the inner space of the auxiliary rotor $f$ is not in any way connected by bores, or otherwise, with the interior of the main rotor $e$. At $d$ is shown between the rotor $e$ and the pump casing an annular clearance space at the suction end, while at $b$ is shown between the rotor $e$ and the pump casing an annular clearance space back of the rotor. As the drawing shows, the diameter of the annular clearance $d$ at the suction end is made larger than that of the annular clearance space $b$ back of the rotor, so as to thereby insure a good axial sliding movement of the impeller shaft.

At $g$ is shown a conical part secured to shaft $a$ which conical part is surrounded by a stuffing box shown at $h$ and containing suitable packing rings. When the pump is not running, the said conical part $g$ is in contact with the packing rings in the stuffing box $h$, from which, however, it becomes separated while the pump is in operation. In this way, any friction and mechanical wear are avoided, but as will be readily seen from the drawing, in case of wear, the packing rings in the stuffing box $h$ can be easily exchanged and renewed without any dismantling of the pump being required. Also, instead of soft packing, as ordinarily used in stuffing boxes, hard, unimpregnated packing rings, e. g. of asbestos, can be used, which offer greater resistance to the action of acids, lyes and hot liquids.

At $l$ are shown the inner race-rings of roller bearings shown at $m$. These inner race-rings which may also be axially displaced, constitute the slide surfaces for the axially displaceable impeller shaft $a$. At $n$ is shown a strong coil spring adapted to return shaft $a$ to its position of rest.

At $o$ is shown a bushing, by the turning of which in one or the other direction the extent of displacement of the impeller shaft $a$ can be controlled in such a manner that the seating surfaces shown at $i$ and $k$ are either brought in contact with each other without any clearance space between them, or are only approached to each other without touching each other. The latter adjustment must be chosen when with regard to the material employed for the packing rings in the stuffing box, the dry run of the pump would be liable to damage the packing surfaces.

The seating surfaces $i$ and $k$ when brought in contact with each other without clearance space will still effect a sufficiently tight packing when the packing rings in the stuffing box are worn out so as to prevent the escape of large amounts of liquid.

I claim:

1. A centrifugal pump comprising a casing, an impeller shaft extending through a wall of said casing, an impeller on said shaft within said casing, a stuffing box carried by said wall in surrounding relationship to said shaft, said shaft having a conical portion disposed in said stuffing box and tapering outwardly relative to said casing, packing rings in said stuffing box around said conical portion of said shaft, a nut threaded into the outer portion of said stuffing box for urging the packing rings into said box, means whereby the shaft is displaced axially inward relative to the casing by wet operation of the pump to cause said conical portion of said shaft to recede into spaced relationship to said packing rings, and means for axially displacing said shaft outwardly relative to said casing upon stoppage of operation of said pump to cause said conical portion of said shaft to effect shaft sealing contact with said packing rings.

2. A centrifugal pump comprising a casing, an impeller shaft extending through a wall of said casing, an impeller on said shaft within said casing, a stuffing box carried by said wall in surrounding relationship to said shaft, said shaft having a conical portion disposed in said stuffing box and tapering outwardly relative to said casing, packing rings in said stuffing box around said conical portion of said shaft, a nut threaded into the outer portion of said stuffing box for urging the packing rings into said box, means whereby the shaft is displaced axially inward relative to the casing by wet operation of the pump to cause said conical portion of said shaft to recede into spaced relationship to said packing rings, means for axially displacing said shaft outwardly relative to said casing upon stoppage of operation of said pump to cause said conical portion of said shaft to effect shaft sealing contact with said packing rings, a sealing surface carried by said casing wall inwardly of said packing rings and in surrounding relationship to said shaft, and an annular sealing surface carried by said shaft inwardly of said first mentioned sealing surface to be moved into shaft sealing relationship to said first mentioned sealing surface by outward axial displacement of the shaft following a predetermined amount of wear of said packing rings, said sealing surfaces being normally maintained spaced from each other.

PAUL BUNGARTZ